July 12, 1960 D. E. KREEGER 2,944,362
PORK-RIND JACKET LURE
Filed Dec. 2, 1957

INVENTOR
DONALD E. KREEGER
BY Justar Miller
ATTORNEY

United States Patent Office 2,944,362
Patented July 12, 1960

2,944,362

PORK-RIND JACKET LURE

Donald E. Kreeger, Box 744, Ruskin, Fla.

Filed Dec. 2, 1957, Ser. No. 700,134

4 Claims. (Cl. 43—42.06)

This invention relates to fish lures, and it particularly relates to lures which use artificial bait such as pork rinds or the like.

It is well known that a relatively rigid body having a flexible strip such as pork rind, a rubber strip, etc. dangling therefrom, can be caused to travel through the water in such manner as to simulate the appearance of live bait. This is especially true when the rigid body is given a darting and wobbling action of its own. Many different types of fish lures have heretofore been made embodying this principle. However, these prior devices have generally been subject to one defect or another. Some were too complex, some were too expensive and some were ineffective for the purpose. One of the chief defects, however, was that when casting, the flexible strip often became fouled on the hook.

It is, therefore, one object of the present invention to provide a fishhook device, of the above type, which is relatively simple in construction and easy to use.

Another object of the present invention is to provide a fishhook device, of the above type, wherein the hook will not become fouled by the flexible strip during casting.

Other objects of the present invention are to provide an improved fishhook device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which.

Figure 6:
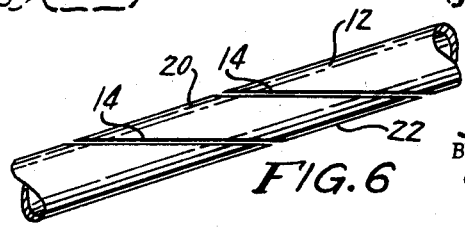
Fig. 6 is a perspective view of a piece of tubing which forms the blank from which the body of the lure is made.

Referring now in greater detail to the drawing wherein similar reference characters refer to similar parts, there is shown a metal body or jacket 10 which is generally tubular in shape and is cut from a tubular section 12 (Fig. 6) along the cut lines indicated at 14. The inclined end portions of the body 10, as indicated at 16 and 18 (Fig. 2) correspond to the curved edges 20 and 22 respectively of the tube 12 while the open sides or ends 24 of the body 10 correspond to the cuts 14 in the tube 12. The sides or ends 24 extend in parallel planes inclined at an acute angle to the axis of the tubular body 10. The length and diameter of the body are related to the angle of inclination of the parallel planes of the sides or ends 24 in such a way that the rear edge portion of the most forwardly extending end portion 16 is substantially forward of the forward edge portion of the most rearwardly extending end portion 18.

One of the open sides 24 is partially closed by an action plate, made of metal or the like, shown at 26. This action plate 26 is generally flat and is held on the body 10 by means of soldering, welding, or the like indicated at 28. The upper end of the action plate 26 is spaced from the upper end of portion 16 to form an opening 30 in the device.

Figure 1:
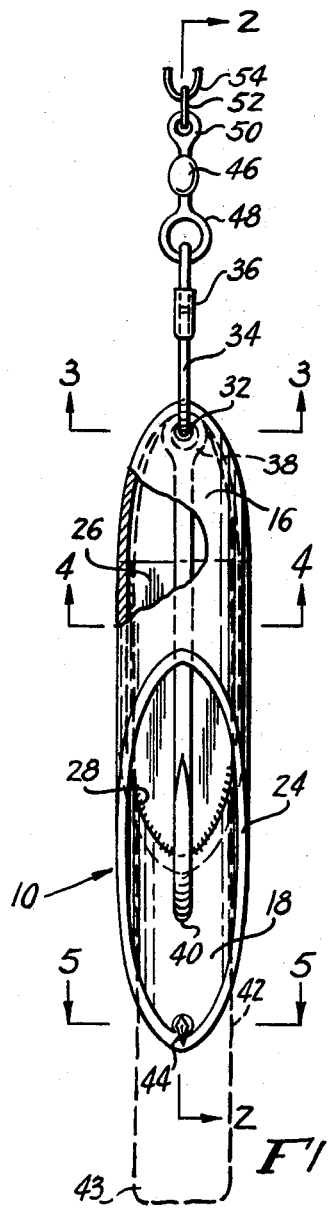
Fig. 1 is a side elevational view, partly broken away, of a fish lure embodying the present invention.
Figure 2:
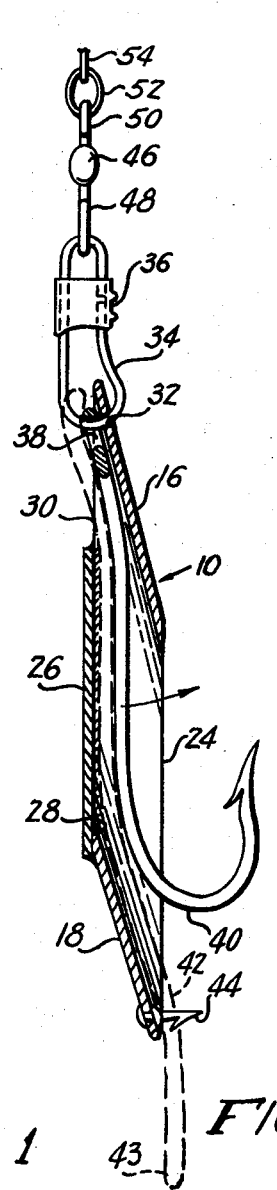
Fig. 2 is a sectional view taken on line 2—2 of Fig. 1.
Figure 3:
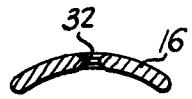
Fig. 3 is a sectional view taken on line 3—3 of Fig. 1.
Figure 4:
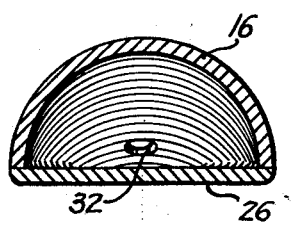
Fig. 4 is a sectional view taken on line 4—4 of Fig. 1.
Figure 5:
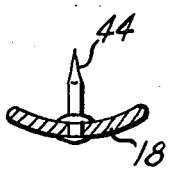
Fig. 5 is a sectional view taken on line 5—5 of Fig. 1.

The upper end of portion 16 is provided with an aperture 32 adapted to receive the hook portion of a snap fastener 34. The snap fastener 34 is a unitary pin having an open-ended hook portion which is adapted to pass through the aperture 32 and then be closed by being inserted into the sleeve 36, as best shown in Fig. 2. The hook portion of the snap fastener 34 is also adapted to pass through an aperture 38 in the upper end of a fish hook 40 as well as through an aperture in the upper end of a pork rind 42 or the like.

The pork rind 42 hangs loosely from the snap fastener 34 and extends through the jacket 10 to well below the lower end of the jacket, leaving a tail portion 43 dangling below the jacket 10. The pork rind is secured at its lower portion, just above the tail portion, to a barb 44 which is secured through end of portion 18 of the jacket 10.

The entire lure assembly is dependent from a swivel 46 which has an eyelet 48 at its lower end to receive the snap fastener 34 and an eyelet 50 at its upper end to receive a ring 52 on a line 54.

In operation, the lure assembly is cast into the water where a darting from side to side or a wobbling action is effected by the jacket 10 during its stay in the water. This is caused by the flow of the water through the jacket 10 where it strikes the action plate to cause the wobbling movements. Meanwhile, the tail of the pork rind flutters and ripples so that the entire lure assembly vibrates with simulated, life-like movements.

Ordinarily, the pork rind would tend to flap up and foul itself on the hook 40 during casting. However, this is prevented by the action of centrifugal force on the hook 40 which causes it to swing up and away from the free-flapping tail of the pork rind below the barb 44. This swinging motion up and away from the tail portion of the pork rind is aided by the fact that the somewhat enlarged aperture 38 at the upper end of the hook 40 provides a certain amount of vertical lost motion. Consequently, the hook 40 is laterally farther removed from the plane of the tail portion of the pork rind. This increased distance of the hook 40 from the pork rind almost completely eliminates the tendency of fouling by the pork rind. Furthermore, this type of construction allows the hook 40 to fall clear from the jacket 10 as soon as a fish is hooked. This gives full throat clearance of the hook as it penetrates to its full depth. During retrieve of the lure, approximately three-quarters of the hook 40 is covered from view of the fish as the hook lies closely within the confines of the jacket as the line is being pulled in.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A fish lure comprising an open tubular body having its tubular ends extending in parallel planes inclined at an acute angle to its axis and having its length and diameter in such relation to the angle of inclination of said parallel planes that the axially aligned rear edge portion of the most forwardly extending end portion is substantially forward of the axially aligned forward edge portion of the most rearwardly extending end portion, a fish line-receiving swivel connection secured to said tubular body adjacent the forward end edge of said most forwardly extending portion, a barb secured to and extending outwardly of said tubular body from its inner wall adjacent a point on the most rearwardly extending end portion edge most remote from said swivel connection securing area, a pork-rind mounted at one end on said swivel connection and extending through said open tubular body and secured to said barb, said pork-rind having a free flapping tail portion extending beyond said barbed end of said tubular body, and a fish hook mounted on said swivel connection intermediate said pork-rind and said most forward end edge of said tubular body, said fish hook having its hook shank extending through said open tubular body and its hook point extending exteriorly of said open tubular body and facing away from said pork-rind tail portion.

2. The fish lure of claim 1, and a flat action plate secured to one of said tubular ends except adjacent said swivel connection securing area of said tubular body, thereby partially but not completely closing the opening through one of said tubular ends.

3. The fish lure of claim 2, said tubular body being cylindrical.

4. A fish lure comprising an open tubular body having first and second open elliptical end edges whose planes are parallel to each other and at such an acute angle in relation to the diameter and to the axis of the tubular body that the axially aligned rear end edge portion of the most forwardly extending portion is substantially forward of the axially aligned forward end edge portion of the most rearwardly extending portion, an action plate secured along said first elliptical end edge except adjacent the elliptical edge end more remote from the more remote elliptical edge end of the second elliptical end edge, thereby partially but not completely closing the opening therethrough, a swivel connection secured through an aperture in said tubular body adjacent said first elliptical end edge more remote end, a barb secured to said tubular body and extending outwardly of said tubular body from its inner wall adjacent said second elliptical end edge more remote end, a pork-rind secured at one end to said swivel connection and extending through the open body and secured on said barb with a free flapping tail portion extending therebeyond, and a fish hook secured on said swivel connection intermediate said pork-rind and said swivel connection aperture in said tubular body and extending through said open tubular body and beyond the plane of said second elliptical edge with its hook facing away from said pork-rind tail.

References Cited in the file of this patent
UNITED STATES PATENTS

| | | |
|---|---|---|
| 1,854,024 | Farley | Apr. 12, 1932 |
| 2,148,784 | Stewart et al. | Feb. 28, 1939 |
| 2,176,803 | Rosselle | Oct. 17, 1939 |
| 2,229,239 | Davis | Jan. 21, 1941 |
| 2,423,615 | Pecher | July 8, 1947 |
| 2,557,577 | Soma | June 19, 1951 |
| 2,846,805 | Waitzman | Aug. 12, 1958 |